United States Patent
Li et al.

(10) Patent No.: US 7,936,766 B2
(45) Date of Patent: May 3, 2011

(54) SYSTEM AND METHOD FOR SEPARATING LOGICAL NETWORKS ON A DUAL PROTOCOL STACK

(75) Inventors: Qing Li, San Jose, CA (US); Neeraj Bhatia, Alameda, CA (US)

(73) Assignee: Wind River Systems, Inc., Alameda, CA (US)

( * ) Notice: Subject to any disclaimer, the term of this patent is extended or adjusted under 35 U.S.C. 154(b) by 1930 days.

(21) Appl. No.: 10/251,723

(22) Filed: Sep. 20, 2002

(65) Prior Publication Data
US 2004/0057441 A1    Mar. 25, 2004

(51) Int. Cl.
*H04L 12/28* (2006.01)
*H04L 12/56* (2006.01)
(52) U.S. Cl. .............. 370/395.5; 370/389; 370/392; 370/465
(58) Field of Classification Search ............ 370/392, 370/401, 349, 234, 255
See application file for complete search history.

(56) References Cited

U.S. PATENT DOCUMENTS

| | | | | |
|---|---|---|---|---|
| 6,279,140 B1 * | 8/2001 | Slane | ............... | 714/807 |
| 6,708,219 B1 * | 3/2004 | Borella et al. | ............... | 709/245 |
| 6,862,274 B1 * | 3/2005 | Tsao et al. | ............... | 370/338 |
| 6,961,348 B2 * | 11/2005 | Yu | ............... | 370/466 |
| 7,007,103 B2 * | 2/2006 | Pinkerton et al. | ............... | 709/238 |
| 7,065,367 B2 * | 6/2006 | Michaelis et al. | ............... | 455/452.2 |
| 7,194,263 B2 * | 3/2007 | Bahl et al. | ............... | 455/432.1 |
| 7,426,579 B2 * | 9/2008 | McDaniel | ............... | 709/250 |
| 2004/0019689 A1 * | 1/2004 | Fan | ............... | 709/230 |

* cited by examiner

*Primary Examiner* — Michael J Moore, Jr.
(74) *Attorney, Agent, or Firm* — Fay Kaplun & Marcin, LLP

(57) ABSTRACT

An operating system, comprising a first component including a first protocol stack configured to process data packets of a first type, wherein the first component is initialized independently of other components in the operating system, a second component including a second protocol stack configured to process data packets of a second type, wherein the second component is initialized independently of the other components in the operating system, and a third component configured to receive data packets of the first type and the second type and direct the data packets of the first type to the first component and the data packets of the second type to the second component.

22 Claims, 5 Drawing Sheets

SYSTEM AND METHOD FOR SEPARATING LOGICAL NETWORKS ON A DUAL PROTOCOL STACK

BACKGROUND INFORMATION

A computer network is simply a group of two or more computer or computing devices that are linked together. A personal computer ("PC") or server is generally regarded as a traditional computing device, but other computing devices such as embedded devices (e.g., personal digital assistants ("PDAs"), mobile phones, routers, switches, etc.) may also be included as part of a computer network. Many types of networks exist, but the most common types of networks are Local-Area Networks (LANs) and Wide-Area Networks (WANs). In a LAN, the computing devices are connected within a "local" area, for example, a home or office. A LAN generally connects less than 100 network nodes. In a WAN, the interconnected computers are generally farther apart and are connected via telephone/communication lines, radio waves, or other means of communication. A Metropolitan Area Network ("MAN") may include hundreds or even thousands of interconnected computing devices. There are also other network devices, for example, bridges, routers and switches, which may be used to link different networks or network segments into a larger network with more resources.

In a heterogeneous environment, such as a computer network, it is essential that each of the interconnected devices be able to receive information from and transmit information to the other devices in the network. The information transferred between network devices is generally referred to as data packets or packets and this transfer of information is generally referred to as packet flow. In response to the need for the different devices to communicate, standards bodies and other entities have developed numerous protocols for data packet flow over a network. A protocol specifies a common set of rules for packet format and packet flow, allowing a variety of devices to communicate. A layering model is the most common approach to dividing a communication model into subparts. The idea behind layering is that each layer is responsible for providing a service to the layer above by using the services of the layer below. Each layer communicates with its peer layer in another network node through the use of the protocol.

An example of a communication model using the layering approach is the OSI model which may include layer 1 ("L1") which is sometimes referred to as the physical layer, layer 2 ("L2") which is sometimes referred to as the data link layer and layer 3 ("L3") which is sometimes referred to as the network layer. The current BSD OS and its variant operating systems do not separate L2 from L3, and do not separate L3 protocols, e.g., Internet Protocol version 4 ("IPv4") and Internet Protocol version 6 ("IPv6"), in terms of initialization, operation, runtime control/management and shutdown. As such, the current operating systems present difficulties in implementing some, or portions of some Management Information Base (MIB) objects using the Simple Network Management Protocol (SNMP) and in implementing fine-grained control of L2 and the individual L3 protocols. In addition, the internal code and data structure dependencies increase the memory footprint of the final system on both embedded and non-embedded devices. Since embedded devices generally have less available memory, this impact is more visible on embedded devices. Device performance is also downgraded on a physical network that carries both IPv4 and IPv6 traffic due to the operational dependencies, i.e., the operation of one logical network implies the concurrent operation of the other logical network.

SUMMARY OF THE INVENTION

An operating system, comprising a first component including a first protocol stack configured to process data packets of a first type, wherein the first component is initialized independently of other components in the operating system, a second component including a second protocol stack configured to process data packets of a second type, wherein the second component is initialized independently of the other components in the operating system, and a third component configured to receive data packets of the first type and the second type and direct the data packets of the first type to the first component and the data packets of the second type to the second component.

In addition, a method, comprising the steps of setting a first variable to an up state, the first variable being associated with a first component configured to process data packets of a first type and setting a second variable to an up state, the second variable being associated with a second component configured to process data packets of a second type. Continuing on to set a third variable to an up state, the third variable being associated with the first component, wherein the first and third variables being in the up state indicates the first component is ready to process data packets of the first type and setting a fourth variable to an up state, the fourth variable being associated with the second component, wherein the second and fourth variables being in the up state indicates the second component is ready to process data packets of the second type. The first component then receives data packets of the first type and processes the data packets of the first type.

Furthermore, a system, comprising an IPv4 protocol component including a first local variable, an IPv6 protocol component to including a second local variable, a data link layer component configured to direct IPv4 data packets to the IPv4 protocol component and IPv6 data packets to the IPv6 protocol component and a management information base component including a first remote variable for the IPv4 protocol component and a second remote variable for the IPv6 component. When the first local variable and the first remote variable are set to an up state, the IPv4 protocol component is attached to the data link layer component and configured to process IPv4 data packets, and when, the second local variable and the second remote variable are set to an up state, the IPv6 protocol component is attached to the data link layer component and configured to process IPv6 data packets, wherein the IPv4 protocol component and the IPv6 protocol component are attached independently to the data link layer component.

DETAILED DESCRIPTION

Figure 1:
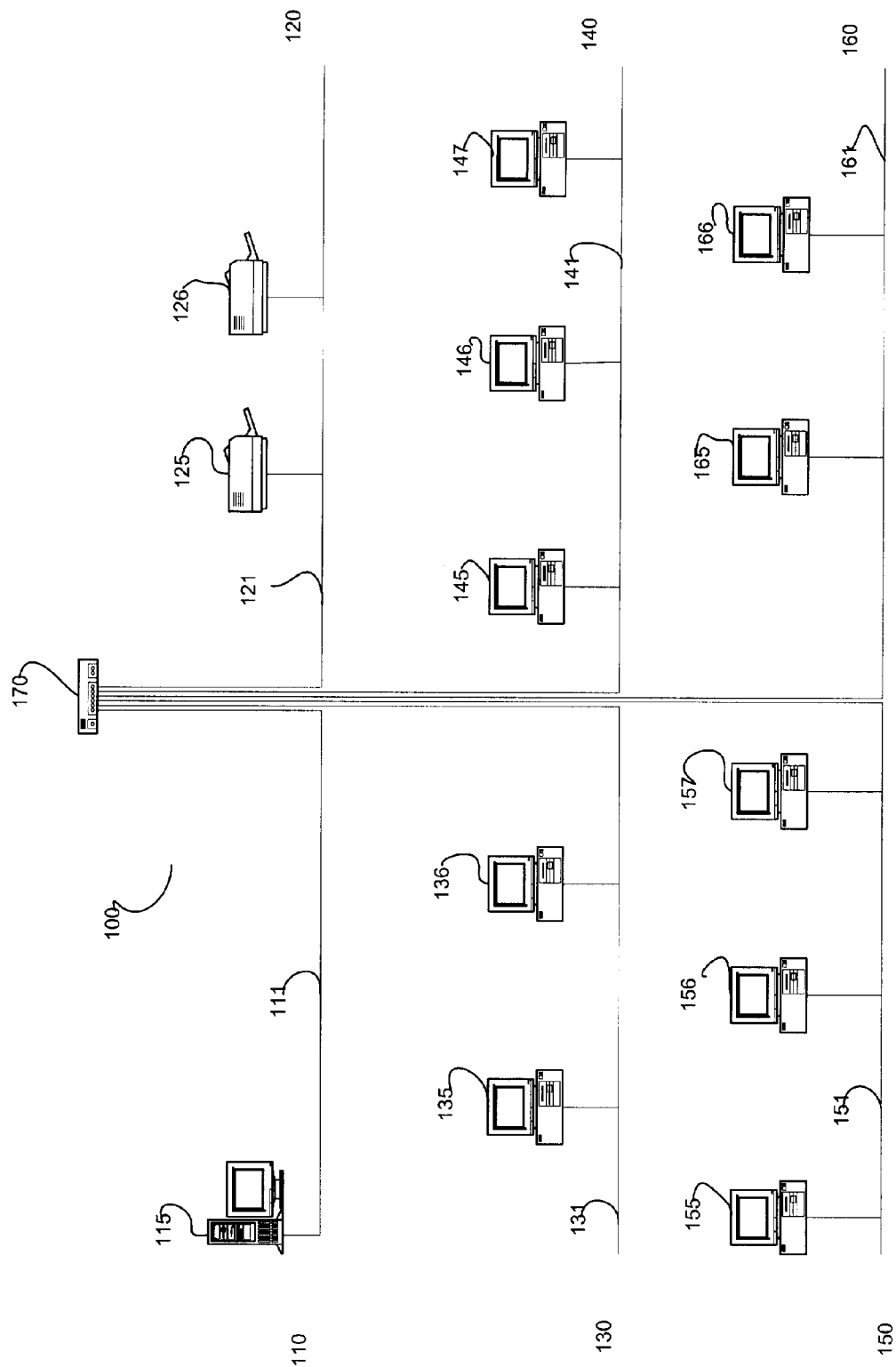
FIG. 1 shows an exemplary network including devices on which the present invention may be implemented.

The present invention may be further understood with reference to the following description and the appended drawings, wherein like elements are provided with the same reference numerals. The exemplary embodiment may be described as being implemented on a computing device and this should be understood to mean any computing and/or electronic device including a processor and/or microprocessor, for example, PCs, servers, internet devices, embedded devices, or any computing device and the term device will be used to generally describe such devices. In addition, the exemplary embodiments of the present invention will be described using the IPv4 and IPv6 protocols. Those of skill in the art will understand that the use of these protocols are only exemplary and that the present invention may be implemented regardless of the particular protocol that is used by the device.

FIG. 1 shows an exemplary network 100 containing devices on which the present invention may be implemented. The network 100 includes six network segments 110-160 each of which has a network bus 111-161 to which various network devices are connected. The network segment 110 has a server 115 connected to the bus 111. The network segment 120 has printers 125-126 connected to the bus 121. The network segment 130 has personal computers (PCs) 135-136 connected to the bus 131. Similarly, the network segments 140-160 have PCs connected to their buses. In the exemplary network 100 of FIG. 1, all of network segments 110-160 are linked via ports of a network switch 170 allowing all the network hardware devices to interconnect with any other hardware device on any of the network segments 110-160. Those skilled in the art will understand that the network 100 is only exemplary and that the present invention may be applied to any network topology, for example, star, bus, ring, etc. and is also not limited by the number or type of hardware devices on the network. For example, the present invention may be implemented on a network comprising only one of the network segments described above or it may be implemented on a network having multiple switches, bridges and routers which allow the network to have hundreds or thousands of connected hardware devices.

When the network 100 is physically connected, the various network hardware devices can begin sending data packets to other network hardware devices. This communication is controlled via a protocol or multiple protocols which specify a common set of rules for packet format and packet flow. The protocols are implemented via the network software which is resident on various network hosts which may include the connected hardware devices. The network software controls the packet flow through the network.

Figure 2:
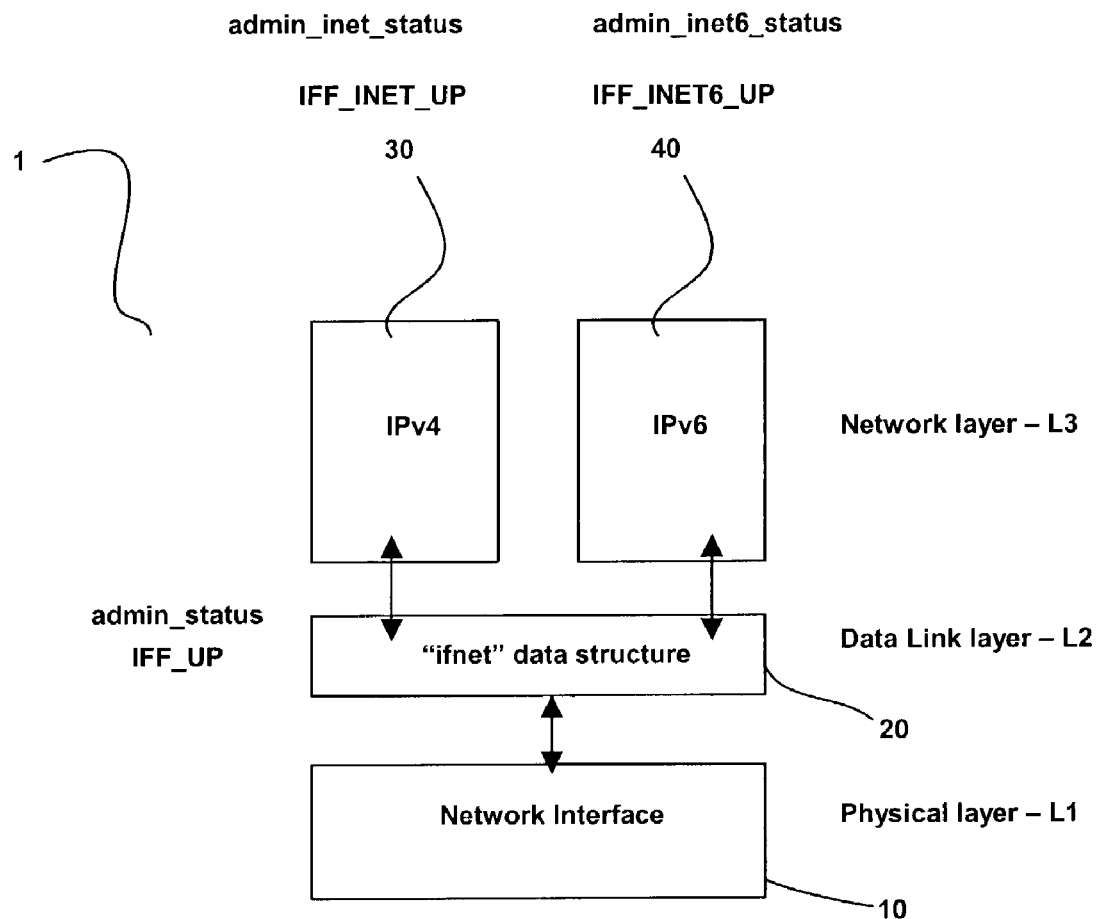
FIG. 2 shows an exemplary system according to the present invention.

FIG. 2 shows an exemplary system 1 having four components 10-40. The component 10 is a physical layer L1 component, for example, a network interface chip/card. The component 20 is a data link layer L2 component, for example, a combination of device driver, control hardware that is an integral part of the network interface chip/card, and control software in the form of an application specific integrated circuit ("ASIC") that is an integral part of the network interface card. The components 30 and 40 are network layer L3 components, for example, an IPv4 component and IPv6 component, respectively. Those of skill in the art will understand that the L1 component 10 may be multiple components for multiple network interfaces. The exemplary embodiment of the present invention removes any interdependencies among the L1 component 10, the L2 component 20, the IPv4 component 30 and the IPv6 component 40. Thus, independent runtime initialization, shutdown, control/configuration, loading and unloading of the L1 component 10, the L2 component 20, the IPv4 component 30 and the IPv6 component 40 are possible. The system 1 may be loaded on any or all of the network hardware devices (e.g., the server 115, the switch 170, the PC 135, etc.) shown in FIG. 1 to allow communication across the network 100.

Those of skill in the art will understand that the L3 components may be protocol stacks (e.g., IPv4 and IPv6) which implement a logical network for receiving and transmitting data packets of the type. For example, the L1 component 10 and the L2 component 20 may receive data packets of any type. However, based on the information within the data packets (e.g., in the data packet header) the L2 component 20 will direct the data packets to the correct L3 component or logical network. Thus, throughout this description, the L3 components 30-40 may also be referred to as logical networks.

A variable (e.g., if_flags) is associated with the L2 component 20. This variable represents the state of the L2 component 20. When the variable is in the up or set state, IFF_UP, the L2 component 20 is ready to transmit and receive data packets of any protocol type. If this variable is in the up state IFF_UP, it implicitly indicates the readiness of the L1 component 10 to transmit and receive data packets. In addition, when the variable is in the down state or not(IFF_UP), i.e., ~IFF_UP, it represents that either the L2 component 20, the L1 component 10 or both are not available. The reason for the L2 component 20 or L1 component 10 not being available may be, for example, a remote manual shutdown of either the L2 component 20 or the L1 component 10 through the Simple Network Management Protocol ("SNMP"), a local manual shutdown of either the L2 component 20 or the L1 component 10 through the local I/O control ("ioctl") commands, an automatic shutdown due to a catastrophic condition detected at the L1 component 10 or the removal of the L1 component 10 in a High Availability system. Examples of catastrophic conditions include the removal of the interface cable, the failure of the transceiver, etc. Those of skill in the art will understand that the above are only exemplary and there may be other reasons for the variable to be in the down state, ~IFF_UP. In addition, those of skill in the art will understand that using the up or set state as an indication of readiness is only exemplary and that there may be other indications or values which may be used to indicate the readiness of the components to process data packets.

A different variable (e.g., if_flags) may also be associated with the IPv4 component 30. This variable represents the state of the IPv4 component 30. When the variable is in the up or set state, IFF_INET_UP, the IPv4 component 30 has been loaded, initialized and attached to the L2 component 20. In addition, when the variable is in the up state, IFF_INET_UP, a valid IPv4 address has been assigned to the logical IPv4 network on which the IPv4 component 30 operates and the IPv4 component 30 is ready to transmit and receive transport layer packets carried over the IPv4 protocol packets. The types of transport layer packets carried over the IPv4 protocol packets may be, for example, Transmission Control Protocol ("TCP") packets, User Datagram Protocol ("UDP") packets, and Internet Control Message Protocol ("ICMP") packets. Once again, those of skill in the art will understand that the use of an IPv4 protocol module (or the IPv6 protocol module) is only exemplary and that any protocol module or other logical network component may be present at the L3 layer. In addition, these L3 components may transmit and receive data packets according to the above described exemplary protocols or any other protocols.

The down state or not(IFF_INET_UP) of the variable, i.e., ~IFF_INET_UP, represents that either the IPv4 logical network (e.g., IPv4 component 30) has been intentionally disabled or no valid IPv4 address is assigned to the IPv4 logical network. When in the down state ~IFF_INET_UP, the transmission or reception of IPv4 packets is not permissible. The state transition from IFF_INET_UP to ~IFF_INET_UP may be caused by, for example, a remote manual shutdown of the IPv4 component 30 through SNMP, a local manual shutdown of the IPv4 component 30 through the local ("ioctl") commands, the remote removal of all valid IPv4 addresses from the IPv4 component 30 through SNMP and the local removal of all valid IPv4 addresses from the IPv4 component 30 through the local ("ioctl") commands.

A third variable (e.g., if_flags) may also be associated with the IPv6 component 40. This variable represents the state of the IPv6 component 40. Those of skill in the art will understand that each of the exemplary variables described above is named "if_flags" according to good programming practice because their functions in each of the modules are similar. However, the variables may have any name. When the variable is in the up or set state, IFF_INET6_UP, the IPv6 component 40 has been loaded, initialized and attached to the L2 component 20. In addition, when the variable is in the up state IFF_INET6_UP, a valid IPv6 address has been assigned to the logical IPv6 network on which the IPv6 component 40 operates and the IPv6 component 40 is ready to transmit and receive transport layer packets carried over the IPv6 protocol packets. The types of transport layer packets carried over the IPv6 protocol packets may be, for example, TCP packets, UDP packets, ICMPv6 packets, etc.

The down state or not(IFF_INET6_UP) of the variable, i.e., ~IFF_INET6_UP, represents that either the IPv6 logical network (e.g., IPv6 component 40) has been intentionally disabled or no valid IPv6 address is assigned to the IPv6 logical network. When in the down state, ~IFF_INET6_UP, the transmission or reception of IPv6 packets is not permissible. The state transition from IFF_INET6_UP to ~IFF_INET6_UP may be caused by, for example, a remote manual shutdown of the IPv6 component 40 through SNMP, a local manual shutdown of the IPv6 component 40 through the local ("ioctl") commands, the remote removal of all valid IPv6 addresses from the IPv6 component 40 through SNMP, the local removal of all valid IPv6 addresses from the IPv6 component 40 through the local ("ioctl") commands or the IPv6 address has been determined to be a duplicated IPv6 address through the automatic IPv6 Duplicate Address Detection ("DAD") protocol. DAD packets are special IPv6 packets which may be transmitted when the variable is in the down state ~IFF_INET6_UP.

In general, the exemplary embodiment of the present invention allows the separation of the various layers and components. The associated variables allow for the independent initialization, shutdown, control/configuration and loading/unloading of the various components. However, there may be some instances where the data packet transmission is dependent on multiple layers being simultaneously available. For example, both the L2 state variable and L3 state variable may need to be in the corresponding up state, IFF_UP and IFF_INET_UP, for the reception and transmission of Address Resolution Protocol ("ARP") packets.

SNMP is a standard protocol for network management software. Using SNMP, programs called agents monitor various devices on the network (hubs, routers, bridges, etc.). Another program collects the data from the agents. The database created by the monitoring operations is called a Management Information Base ("MIB"). This data may be used to check if all devices on the network are operating properly. Those skilled in the art will understand that there are some standard MIBs as defined by protocol Request for Comments (RFCs) and other MIBs which may be user or system administrator defined, for example, an enterprise MIB.

Figure 3:
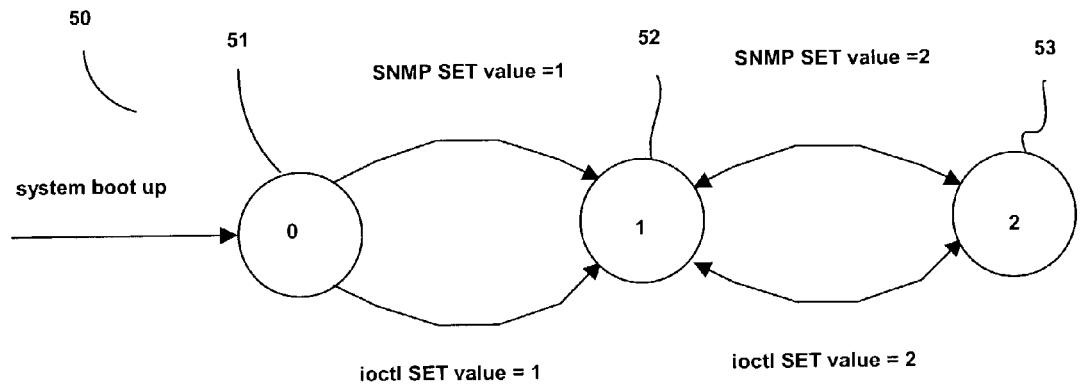
FIG. 3 shows a state diagram for an exemplary SNMP/MIB variable "admin status" according to the present invention.

FIG. 3 shows a state diagram 50 for an exemplary SNMP/MIB status variable that may be set for the L2 component 20 and the logical networks (e.g., L3 components 30-40) of the exemplary embodiment. The SNMP/MIB status variable may be located remotely from the device implementing the components 10-40 (e.g., the switch 170, the PC 135, etc.). For example, the SNMP variable may be located on the server 115, i.e., the device used by the network or system administrator to configure the network 100. The reason for possibly locating the SNMP status variable remotely from the device containing components 10-40 will be described in greater detail below. Those of skill in the art will understand that implementing the status variable as a SNMP/MIB variable is only exemplary and that the status variable may be implemented in other manners.

The SNMP variable may be called admin_status for the L2 component 20, admin_inet_status for the IPv4 component 30 and admin_inet6_status for the IPv6 component 40. Those of skill in the art will understand that all the variable names used in this description are only for exemplary purposes and any variable names may be used when implementing the exemplary embodiment of the present invention. The SNMP variables related to the L2 component 20 and each of the L3 components 30-40 operate in the same manner. The SNMP variable has three distinct states 51-53. The first state 53 is the value after a successful system boot up. The second state 52 is the up state and may be set via the SNMP or ioctl set commands. Similarly, the third state 53 is the down state and may be set via the SNMP or ioctl set commands. As shown in FIG. 3, the variable may be toggled from the up state to the down state and vice versa using the SNMP or the ioctl set commands.

Figure 4:
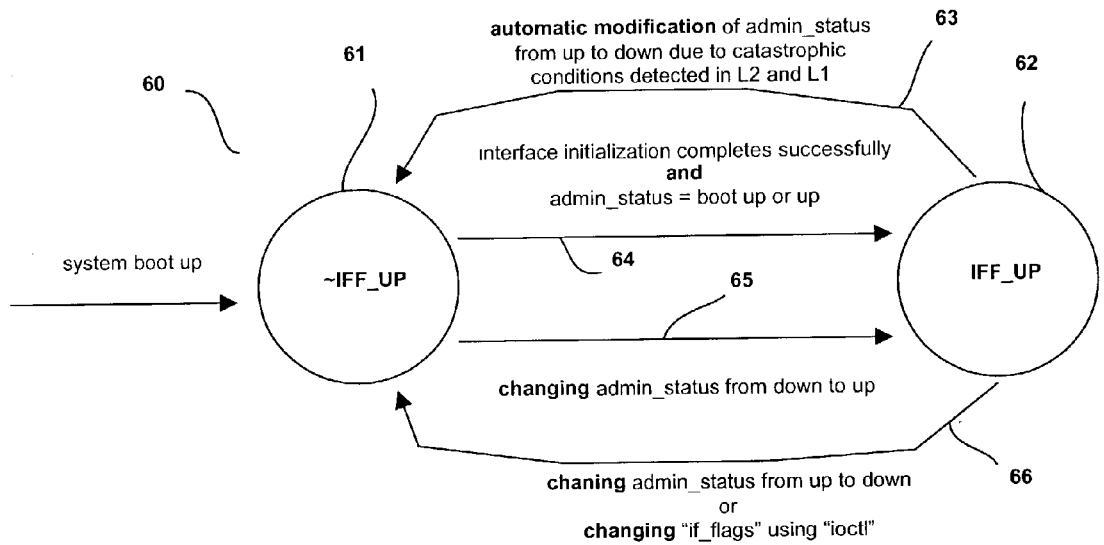
FIG. 4 shows a state diagram showing an exemplary relationship between an SNMP/MIB variable "admin status" and the operating state of L2 according to the present invention.

FIG. 4 shows a state diagram 60 showing an exemplary relationship between an SNMP status variable (e.g., admin_status) and the L2 component 20 state variable. The state diagram 60 shows the L2 component 20 state variable in both the up state IFF_UP 62 and the down state ~IFF_UP 61. When the system boots up, the L2 component 20 state variable is in the down state ~IFF_UP 61. The variable may be changed from the down state ~IFF_UP 61 to the up state IFF_UP 62 in at least two manners as shown by paths 64 and 65. The path 64 shows that the variable may be toggled when the interface initialization is completed successfully and the SNMP status variable for the L2 component 20 (e.g., admin_status) is in the boot up or up state (e.g., states 51 and 52, respectively, as shown in FIG. 3).

The path 65 shows that the variable may be toggled when the SNMP status variable for the L2 component 20 (e.g., admin_status) is changed from the down state to the up state (e.g., state 53 to state 52 as shown in FIG. 3). In either case, the L2 component state variable may automatically (or manually via the user of the device) be changed from the down state ~IFF_UP 61 to the up state IFF_UP 62. As described above, when the L2 component 20 state variable is in the up state IFF_UP 62, the L2 component 20 (and the L1 component 10 by implication) is ready to transmit and receive data packets of any protocol type.

When the L2 component 20 state variable is in the up state IFF_UP 62, there are at least two manners as shown by paths 63 and 66 by which the variable may transition to the down state ~IFF_UP 61. The path 63 shows that the variable may transition to the down state ~IFF_UP 61 when there is an automatic modification of the L2 component 20 SNMP status variable admin_status from the up state to the down state (e.g., state 52 to state 53 as shown in FIG. 3) because of the detection of catastrophic conditions in either the L2 component 20 or the L1 component 10. Examples of such catastrophic conditions were described above. The path 66 shows that the variable may transition to the down state ~IFF_UP 61 when the L2 component 20 SNMP status variable admin_status is manually changed from the up state to the down state (e.g., state 52 to state 53 as shown in FIG. 3) or when the L2 component 20 state variable is manually changed using the ioctl.

Thus, it can be seen that in the exemplary embodiment of the present invention, the L2 component 20 is separated from the L3 components 30 and 40. The L2 component may be independently initialized, configured, loaded or shutdown during runtime using the L2 component 20 state variable if_flags and the L2 component 20 SNMP status variable admin_status. For example, assume that the system 1 is contained on the PC 135, a user of the PC 135 may determine that there is a problem with the L2 component 20. The user may shutdown the L2 component 20 by toggling the L2 component 20 state variable from the up state IFF_UP 62 to the down state ~IFF_UP 61 using the ioctl. The user may then unload the L2 component 20 in favor of a new or upgraded L2 component 20 which may then be loaded onto the PC 135. The new L2 component 20 may be initialized and configured and then the L2 component 20 state variable may be toggled from the down state ~IFF_UP 61 to the up state IFF_UP 62 indicating that the new L2 component 20 is ready to transmit and receive data packets. This entire procedure could be performed while the PC 135 (and the L3 components 30 and 40) remained in the runtime state.

Similarly, the system administrator at the server 115 may have remotely shutdown the L2 component 20 by toggling the SNMP status variable admin_status from the up state to the down state in order to perform routine maintenance on the L2 component. Those of skill in the art will understand that there are any number of reasons for automatically or manually shutting down the L2 component 20 during runtime, but wanting to leave the L3 components running. Those of skill in the art will also understand that not all data packet communication is via the L2 component 20 and L1 component 10. When these components are shutdown, data packet communication remains possible using the so-called "interprocess communication." For example, the L3 components 30 and 40 sockets may provide interprocess communication between the processes or applications residing on the same network node (e.g., PC 135), including multicasts to other sockets on the node. These communications may continue regardless of whether the applications or processes are local or remote from the device as long as they are on the same network node. When the L2 component 20 is shutdown, the device (e.g., PC 135) may not transmit or receive data packets from across the network, i.e., from other network nodes.

Figure 5:
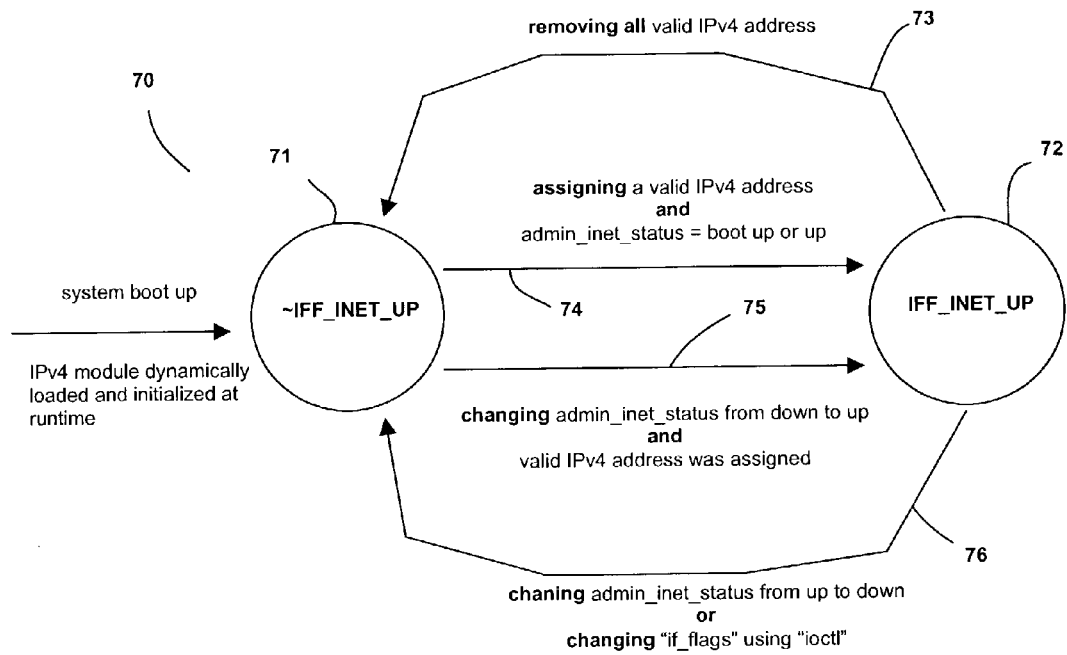
FIG. 5 shows a state diagram showing an exemplary relationship between an SNMP/MIB variable "admin inet status" and the operating state of an L3 IPv4 logical network according to the present invention.

FIG. 5 shows a state diagram 70 showing an exemplary relationship between an SNMP status variable (e.g., admin_inet_status) and an IPv4 component 30 state variable (e.g., if_flags). The state diagram 70 shows the IPv4 component 30 state variable in both the up state IFF_INET_UP 72 and the down state ~IFF_INET_UP 71. When the system boots up, the IPv4 component 30 state variable is in the down state ~IFF_INET_UP 71. The variable may be changed from the down state ~IFF_NET_UP 71 to the up state IFF_INET_UP 72 in at least two manners as shown by paths 74 and 75. The path 74 shows that the variable may be toggled when a valid IPv4 address is assigned to the IPv4 component 30 and the SNMP status variable for the IPv4 component 30 (e.g., admin_inet_status) is in the boot up or up state (e.g., states 51 and 52, respectively, as shown in FIG. 3).

The path 75 shows that the variable may be toggled when the SNMP status variable for the IPv4 component 30 (e.g., admin_inet_status) is changed from the down state to the up state (e.g., state 53 to state 52 as shown in FIG. 3) and a valid IPv4 address was assigned to the IPv4 component 30. In either case, the IPv4 component 30 state variable may automatically (or manually via the user of the device) be changed from the down state ~IFF_INET_UP 71 to the up state IFF_INET_UP 72. As described above, when the IPv4 component 30 state variable is in the up state IFF_INET_UP 72, the IPv4 component 30 is ready to transmit and receive IPv4 data packets.

When the IPv4 component 30 state variable is in the up state IFF_INET_UP 72, there are at least two manners as shown by paths 73 and 76 by which the variable may transition to the down state ~IFF_INET_UP 71. The path 73 shows that the variable may transition to the down state ~IFF_INET_UP 71 when all valid IPv4 addresses are removed from the IPv4 component 30. The path 76 shows that the variable may transition to the down state ~IFF_INET_UP 71 when the IPv4 component 30 SNMP status variable admin_inet_status is automatically or manually changed from the up state to the down state (e.g., state 52 to state 53 as shown in FIG. 3) or when the IPv4 component 30 state variable is manually changed using the ioctl.

Similar to the L2 component 20, the exemplary embodiment of the present invention allows for various operations or states of the IPv4 component 30 independent of any other components on the device (e.g., L1 component 10, L2 component 20, IPv6 component 40). For example, during system initialization, the IPv4 component 30 may be initialized using a delay. In this case, the IPv4 address may be assigned in the usual manner, but the IPv4 component 30 SNMP status variable admin_inet_status and the IPv4 component 30 variable if_flags may remain in the down state meaning that the IPv4 component 30 is not operating. At some later time, the system administrator, the user or some automatic event may cause the IPv4 component 30 SNMP status variable admin_inet_status and/or the IPv4 component 30 variable if_flags to transition to the up state meaning that the IPv4 component 30 is ready to receive and/or transmit IPv4 packets.

This feature may be used, for example, when the network traffic (or the network traffic destined for the particular device) primarily consists of IPv6 data packets with only intermittent IPv4 data packets. Continuing with the example of the system 1 being loaded onto the PC 135, the user of PC 135 or the system administrator at the server 115 may desire to leave the IPv4 component 30 in the down state until it is needed to receive the intermittent IPv4 data packets. In this manner system resources may be conserved because the IPv4 component 30, when down, does not need to screen or receive all the IPv4 data packets which are being sent through the network, but not destined for the PC 135.

Similarly, when the IPv4 component 30 is running, it may be temporarily shut down and then resume operation by toggling the IPv4 component 30 SNMP status variable admin_inet_status and/or the IPv4 component 30 variable if_flags. The system shutdown may also be accomplished in the same manner (e.g., toggling the variables) or by removing all previously assigned IPv4 addresses from the IPv4 component 30.

Figure 6:
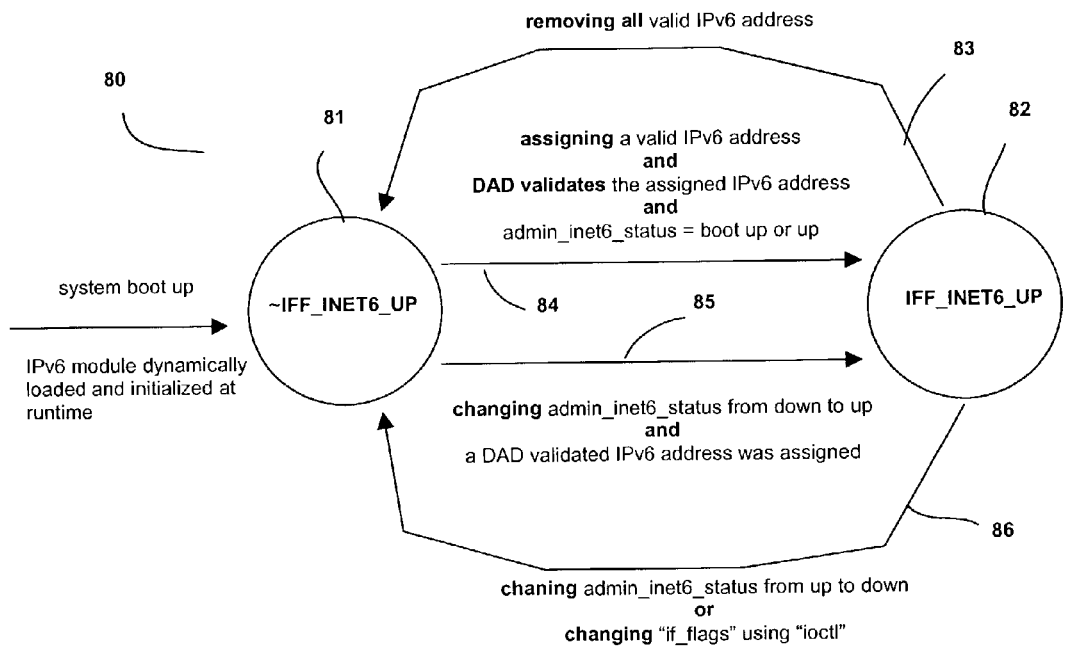
FIG. 6 shows a second state diagram showing an exemplary relationship between an SNMP/MIB variable "admin inet6 status" and the operating state of an L3 IPv6 logical network according to the present invention.

FIG. 6 shows a state diagram 80 showing an exemplary relationship between an SNMP status variable (e.g., admin_inet6_status) and an IPv6 component 40 state variable (e.g., if_flags). The state diagram 80 shows the IPv6 component 40 state variable in both the up state IFF_INET6_UP 82 and the down state ~IFF_INET6_UP 81. When the system boots up, the IPv6 component 40 state variable is in the down state ~IFF_INET6_UP 81. The variable may be changed from the down state ~IFF_INET6_UP 81 to the up state IFF_INET6_UP 82 in at least two manners as shown by paths 84 and 85. The path 84 shows that the variable may be toggled when a valid IPv6 address is assigned to the IPv6 component 40, the duplicate address detection ("DAD") protocol validates the assigned IPv6 address and the SNMP status variable for the IPv6 component 40 (e.g., admin_inet6_status) is in the boot up or up state (e.g., states 51 and 52, respectively, as shown in FIG. 3).

The path 85 shows that the variable may be toggled when the SNMP status variable for the IPv6 component 40 (e.g., admin_inet6_status) is changed from the down state to the up state (e.g., state 53 to state 52 as shown in FIG. 3) and a DAD validated IPv6 address was assigned to the IPv6 component 40. In either case, the IPv6 component 40 state variable may automatically (or manually via the user of the device) be changed from the down state ~IFF_INET6_UP 81 to the up state IFF_INET6_UP 82. As described above, when the IPv6 component 40 state variable is in the up state IFF_INET6_UP 82, the IPv6 component 40 is ready to transmit and receive IPv6 data packets. Those of skill in the art will understand that when the IPv6 component 40 is shutdown, the IPv6 address may remain associated with that component. When there is a transition to the up state, the DAD may be restarted to ensure that the IPv6 address remains valid.

When the IPv6 component 40 variable is in the up state IFF_NET6_UP 82, there are at least two manners as shown by paths 83 and 86 by which the variable may transition to the down state ~IFF_INET6_UP 81. The path 83 shows that the variable may transition to the down state ~IFF_INET6_UP 81 when all valid IPv6 addresses are removed from the IPv6 component 40. The path 86 shows that the variable may transition to the down state ~IFF_INET6_UP 81 when the IPv6 component 40 SNMP status variable admin_inet6_status is automatically or manually changed from the up state to the down state (e.g., state 52 to state 53 as shown in FIG. 3) or when the IPv6 component 40 state variable is manually changed using the ioctl.

The exemplary embodiment of the present invention allows for various operations or states of the IPv6 component 40 independent of any other components on the device. For example, during system initialization, the IPv6 component 40 may be initialized using a delay. In this case, the IPv6 address may be assigned in the usual manner, but the IPv6 component 40 SNMP status variable admin_inet6_status and the IPv6 component 40 state variable if_flags may remain in the down state meaning that the IPv6 component 40 is not operating. At some later time, the IPv6 component 40 SNMP status variable admin_inet6_status may be set to the up state, the DAD protocol may be triggered on the assigned IPv6 address and the IPv6 component 40 state variable if_flags may be set to the up state, IFF_INET6_UP, if the DAD protocol succeeds. Thus, the IPv6 component 40 is ready to receive and/or transmit IPv6 packets.

The independent operations described above for the IPv4 component 30 may also be accomplished by IPv6 component 40, for example, temporary shut down, resumption of operation, system shutdown, etc. The delay in initialization, temporary shutdown, etc. allowed by the exemplary embodiment of the present invention allows for the system resources (e.g., system memory) to be used in a more efficient manner. For example, when the IPv4 component 30 or IPv6 component 40 are not needed, they do not have to be operational and the resources normally allocated to these components may be used for other purposes. This may be particularly useful in embedded devices which generally have fewer computing and memory resources than traditional computing devices.

The following is an example of a situation or scenario showing a network or network devices implementing the exemplary embodiment of the present invention. This example continues with the system 1 being loaded onto the PC 135 of the network 100. It may be considered that each of the components 10-40 are loaded and running on the PC 135. The PC 135 may then come under a denial of service attack in the form of a bombardment of IPv6 data packets. Those of skill in the art will understand that such an attack may be initiated by a disgruntled user of the network 100, a hacker, etc. The user of the PC 135, the IPv6 component 40 or some other component of the PC 135 may determine that an irregular amount of IPv6 traffic is coming into the PC 135 and that this may be the result of a denial of service attack. The user of the PC 135 may then toggle the IPv6 component 40 state variable if_flags to the down state ~IFF_INET6_UP 81 (FIG. 6), thereby shutting down the IPv6 component 40. This prevents the IPv6 component 40 from being overloaded by the malicious data packets.

The user may then send an alarm or message to the system administrator at server 115 using IPv4 data packets via the IPv4 component 30. Since the exemplary embodiment allows for only the IPv6 component 40 of the PC 135 to be shutdown, communication over the network 100 by the PC 135 may be continued using IPv4 data packets via the IPv4 component 30 of the PC 135. The system administrator at the server 115 may then toggle the IPv6 component 40 SNMP variable admin_inet6_status for the PC 135 to the down state to ensure that the IPv6 component 40 remains shutdown during the attack.

The SNMP variable allows for a redundant line of defense in the case of an attack. For example, in a worst case scenario, the hacker may send a signal to the PC 135 to toggle the IPv6 component 40 state variable if_flags to the up state ~IFF_INET_UP 82 (FIG. 6) to allow the IPv6 component 40 to resume receiving the malicious data packets. However, as described above, both the local IPv6 component 40 state variable if_flags and the remote SNMP variable must be in the up state for the IPv6 component 40 to begin receiving data packets. Thus, even though the hacker may toggle the local variable, the remote variable remains in the down state and the IPv6 component 40 remains in the shutdown state during the attack. The remote SNMP variable admin_inet6_status is hidden from the attacker and the network remains secure.

Figure 7:
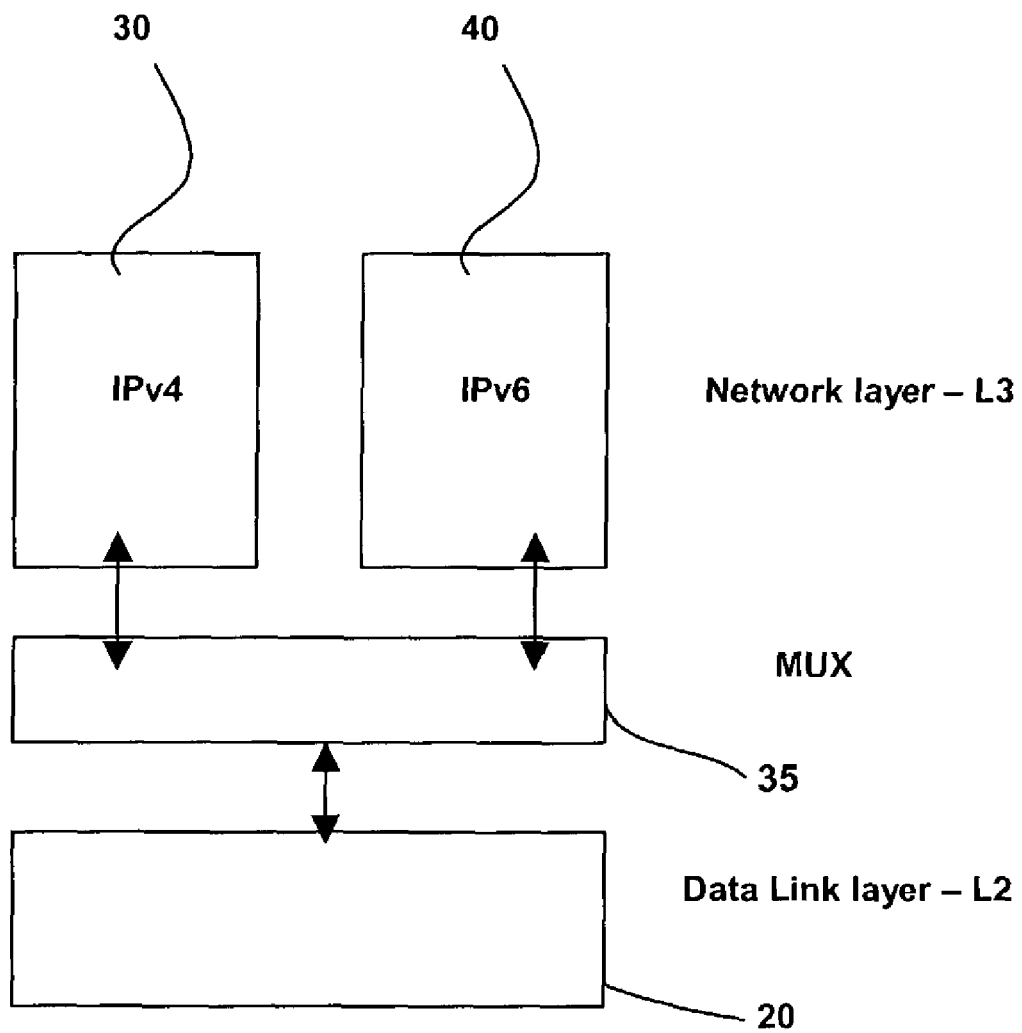
FIG. 7 shows an exemplary system where a multiplexer ("MUX") component is interposed between the L2 component and the L3 components according to the present invention.

Those of skill in the art will understand that there may be situations where there are other components interposed between the L2 component 20 and the L3 components 30 and 40. FIG. 7 shows an exemplary system where a multiplexer ("MUX") component 35 is interposed between the L2 component 20 and the L3 components 30 and 40. The separation of the IPv4 logical network 30 from the IPv6 logical network 40 may also require independent attachment of the IPv4 component 30 and/or IPv6 component 40 to, and the independent detachment from the MUX 35.

An "attached" field of MUX 35 may be an unsigned LONG. In the present invention, usage of this field may be logically split over the two words of the long field. The upper two bytes may store the current status of the protocols attached in the structure (e.g., IP_DRV_CTRL) and the lower two bytes may be used to change the status of the interface during the detach. Two flags are defined for this purpose—IPV6_IF_ATTACHED and IPV4_IF_ATTACHED. The presence of IPV6_IF_ATTACHED in the upper two bytes of the attached field implies that IPv6 component 40 is attached to the MUX 35. The presence of IPV4_IF_ATTACHED in the upper two bytes of the attached field implies that IPv4 component 30 is attached to the MUX 35. The presence of both implies both IPv4 component 30 and IPv6 component 40 are attached to the MUX 35. A MUX 35 ioctl may be used to retrieve the "attached" field. This separation in the present invention makes dynamic loading and unloading of either the IPv4 component 30 or the IPv6 component 40 possible. Thus, the attach and detach procedure described below is for the loading and unloading of components.

The attachment functions may be "ip_attach" and "ip6_attach" for the IPv4 component 30 and the IPv6 component 40, respectively. The present invention allows arbitrary calling sequence of these two functions. A single "ifnet" structure is used to represent the L2 component 20. The present invention ensures a single "ifnet" structure is constructed for the network interface regardless of whether the IPv4 component 30, the IPv6 component 40, or both are attached to the network interface.

The general attach procedure for the L3 components 30 and 40 is as follows. The upper word (i.e., existing status) of the attached field is populated with the appropriate protocol flag to reflect the attachment status. The upper word is checked to determine if one of the component (e.g., IPv4 component 30 and the IPv6 component 40) has been previously attached to a particular interface through the MUX 35. If the L3 component 30 or 40 attempting to be attached has not been previously attached to the MUX 35, the "ifnet" data structure is created, then the interface is attached to the list of active interfaces and an interface index (which is unique for each ifnet structure) is obtained. The process of attaching the component is then complete.

If one of the IPv4 component 30 and the IPv6 component 40 has been previously attached to a particular interface through the MUX 35, then it implies the single "ifnet" data structure has already been created and populated. The process of attaching the component is assumed complete.

The detachment functions may be "ip_detach" and "ip6_detach" for the IPv4 component 30 and the IPv6 component 40, respectively. The present invention allows arbitrary calling sequence of these two functions. The present invention ensures the single "ifnet" structure is removed and disassociated from the network interface and the MUX 35 only when both components 30 and 40 have been detached from that network interface. The detach functions may call a common MUX shutdown routine with appropriate protocol typecode. The shutdown routine trickles down the consequential attach value of detach request in the lower word of the "attache" field. The consequential value will be ~IPV6_IF_ATTACHED for an IPv6 component 40 detach and ~IPV4_IF_ATTACHED for an IPv4 component 30 detach.

The general detach procedure for the L3 components 30 and 40 is as follows. The difference observed in the upper (Existing) and lower (Consequential) words of the "attached" field during the interface detachment (if_detach) indicates the type of request (e.g., IPv4 component 30 or IPv6 component 40) being made. Thus, in the present invention, the if_detach call may be made protocol aware. Once this determination has been made the detach procedure is as follows. If it is determined that it is an IPv4 component 30 detach, the interface for the IPv4 logical network is brought down, all the IPv4 addresses associated with the interface are removed and the IPv4 routing table for entries associated with that interface are cleared.

If it is determined that it is an IPv6 component 40 detach, the interface for the IPv6 logical network is brought down, all the IPv6 addresses associated with the interface are purged, all the IPv6 kernel structures are removed and the IPv6 routing table for entries associated with that interface are cleared. The last protocol that performs the detach will result in the removal of the ifnet structure.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A device, including:
   a processor;
   a memory storing a set of protocols for controlling the execution of the processor, the set of protocols comprising:
   a first protocol including a first protocol stack configured to process data packets of a first type, wherein the first protocol is initialized independently of other software in an operating system and includes a first variable;
   a second protocol including a second protocol stack configured to process data packets of a second type, wherein the second protocol is initialized independently of the other protocols in the operating system and includes a second variable;
   a third protocol configured to receive data packets of the first type and the second type and direct the data packets of the first type to the first protocol and the data packets of the second type to the second protocol,
   wherein, when the first variable and a third variable are set to an up state, the first protocol is attached to the third protocol for processing the first data packets, and when, the second variable and a fourth variable are set to an up state, the second protocol is attached to the third protocol for processing the second data packets; and
   a multiplexer command interposed between the third protocol and the first and second protocol, wherein each of the first, second and third protocols attach to the multiplexer command and data packets directed from the third protocol travel through the multiplexer command to the first and second protocols.

2. The device according to claim 1, wherein the first and second protocols are network layer protocols.

3. The device according to claim 1, wherein the third protocol is a data link layer command.

4. The device according to claim 1, wherein the first protocol stack is one of an Internet Protocol version 6 stack and an Internet Protocol version 4 stack.

5. The device according to claim 1, further comprising: a fourth protocol configured to receive data packets and direct the data packets to the third protocol.

6. The device according to claim 5, wherein the fourth protocol is utilized by one of a network interface card and a network interface chip.

7. The device according to claim 1, wherein an operational state of the first protocol is one of shutdown, configured, loaded and unloaded during runtime.

8. The device according to claim 7, wherein the operational state of the first protocol is independent of the second and third protocols.

9. The device according to claim 1, wherein the third protocol is further configured to transmit data packets received from the first and second protocols.

10. A processor configured to perform a set of control commands stored in a memory, the set of control commands including:
   setting a first variable to an up state, the first variable being associated with a first component configured to process data packets of a first type;
   setting a second variable to an up state, the second variable being associated with a second component configured to process data packets of a second type;
   setting a third variable to an up state, the third variable being associated with the first component, wherein the first and third variables being in the up state indicates the first component is ready to process data packets of the first type;
   setting a fourth variable to an up state, the fourth variable being associated with the second component, wherein the second and fourth variables being in the up state indicates the second component is ready to process data packets of the second type;
   receiving data packets of the first type by the first component;
   processing the data packets of the first type,
   wherein the first component is initialized independently of other components in an operating system, and
   wherein the second component is initialized independently of other components in the operating system; and
   setting a fifth variable to an up state, the fifth variable being associated with a third component configured to process data packets of the first and second types;
   setting a sixth variable to an up state, the sixth variable being associated with the third component, wherein the fifth and sixth variables being in the up state indicates the third component is ready to receive data packets;
   receiving data packets by the third component; and
   directing the data packets to the corresponding one of the first component and second component based on the data packet type.

11. The processor according to claim 10, wherein the set of control commands further includes:
   receiving data packets of the second type by the second component; and
   processing the data packets of the second type.

12. The processor according to claim 10, wherein the first component includes one of an Internet Protocol version 6 stack and an Internet Protocol version 4 stack.

13. The processor according to claim 10, wherein the second and fourth variables are SNMP variables.

14. The processor according to claim 10, wherein the set of control commands further includes:
   setting the third variable to a down state, the second component being unavailable to process data packets when the third variable is in the down state, wherein the first component continues to process data packets of the first type.

15. The processor according to claim 14, wherein the third variable is set to the down state by one of a manual operation and an automatic operation.

16. The processor according to claim 15, wherein the automatic operation occurs based on a failure of the second component.

17. A system, comprising:
   a processor; and
   a system memory storing a set of control commands executable by the processor, the processor system including:
   an IPv4 protocol including a first local variable;
   an IPv6 protocol including a second local variable;
   a data link layer command configured to direct IPv4 data packets to the IPv4 protocol and IPv6 data packets to the IPv6 protocol; and
   a management information base command including a first remote variable for the IPv4 protocol and a second remote variable for the IPv6,
   wherein, when the first local variable and the first remote variable are set to an up state, the IPv4 protocol is attached to the data link layer command and configured to process IPv4 data packets, and when, the second local variable and the second remote variable are set to an up state, the IPv6 protocol is attached to the data link layer command and configured to process IPv6 data packets, wherein the IPv4 protocol and the IPv6 protocol are attached independently to the data link layer command.

18. The system according to claim 17, wherein, when one of the second local variable and the second remote variable is set to a down state, the IPv4 protocol continues to process IPv4 data packets.

19. The system according to claim 17, wherein, when one of the first local variable and the first remote variable is set to a down state, the IPv6 protocol continues to process IPv6 data packets.

20. The system according to claim 17, further comprising:
   a multiplexer command, wherein the IPv4 protocol and the IPv6 protocol attaches to the data link layer command via the multiplexer command.

21. The system according to claim 20, wherein the IPv4 protocol detaches from the data link layer command via the multiplexer command, while the IPv6 protocol remains attached to the data link layer command.

22. The system according to claim 17, wherein the data link layer command further includes a third local variable and the management information base command further includes a third remote variable for the data link layer command, and, when, the third local variable and the third remote variable are in an up state, the data link layer command is configured to receive IPv4 data packets and IPv6 data packets.

* * * * *